United States Patent Office 3,528,948
Patented Sept. 15, 1970

3,528,948
THERMOPLASTIC POLYURETHANES
Franz Gottfried Reuter, Hannover, Germany, assignor to Elastomer, A.G., Chur, Switzerland, a corporation of Switzerland
Continuation-in-part of application Ser. No. 703,786, Feb. 5, 1968, which is a continuation of application Ser. No. 377,535, June 24, 1964. This application Sept. 11, 1968, Ser. No. 759,145
Claims priority, application Germany, June 25, 1963, 1,301,910
Int. Cl. C08g 22/06, 53/00
U.S. Cl. 260—75                                    5 Claims

ABSTRACT OF THE DISCLOSURE

A method is provided for making a storage stable thermoplastic polyurethane which after thermoplastic processing has improved low temperature flexibility wherein a polyester or poly (alkylene ether) glycol, a chain extender and an organic diisocyanate are mixed and reacted at a temperature of about 110°–170° C. to form a thermoplastic polyurethane containing from about 5 to about 40 percent by weight hexamethylene groups.

---

This invention relates generally to thermoplastic polyurethanes and more particularly to a method for making polyurethanes which can be themoplastically processed into polyurethane articles having improved low temperature flexibility and to the product of the novel process. This application is a continuation-in-part of my copending application Ser. No. 703,786 filed Feb. 5, 1968, which application is a continuation of my application Ser. No. 377,535 filed June 24, 1964 and now abandoned.

It has been proposed heretofore to mix organic compounds having reactive hydrogen atoms such as polyesters, poly(alkylene ether) glycols or the like with organic polyisocyanates, interrupt the resulting chemical reaction before a thermoset polyurethane is formed and later process the intermediate product as a thermoplastic resin. While various organic polyisocyanates have been suggested in the prior art as suitable those used to any appreciable extent commercially have been aromatic compounds and most often either 4,4′, diphenyl methane diisocyanate or an isomeric mixture of tolylene diisocyanates. Likewise, various polycarboxylic acids and polyhydric alcohols are suggested in the art for making the polyester but, in actual practice, only adipic acid, ethylene glycol, butane diol, glycerine and trimethylol propane have met with wide success. Such processes do not produce a product having good low temperature flexibility. While hexamethylene diisocyanate has been proposed and hexanediol has been disclosed for making the polyester and for use as a chain extender none of the prior art processes are adapted to produce an entirely satisfactory thermoplastic polyurethane with such compounds and particularly one having good low temperature flexibility.

It is therefore an object of this invention to provide a process for making a thermoplastic polyurethane devoid of the foregoing disadvantages. Another object of the invention is to provide a process for making a thermoplastic polyurethane adapted to form a polyurethane having improved low temperature flexibility. Still another object of the invention is to provide a storage stable polyurethane which can be shaped by thermoplastic processes to form a product having improved physical characteristics. A more specific object of the invention is to provide a storage stable polyurethane which can be shaped by thermoplastic methods to produce a polyurethane having good physical characteristics such as, for example tensile strength, elongation, elasticity, abrasion resistance, tear propagation strength, hardness and improved low temperature flexibility, a process for making the thermoplastic polyurethane and for shaping it.

Figure 1:
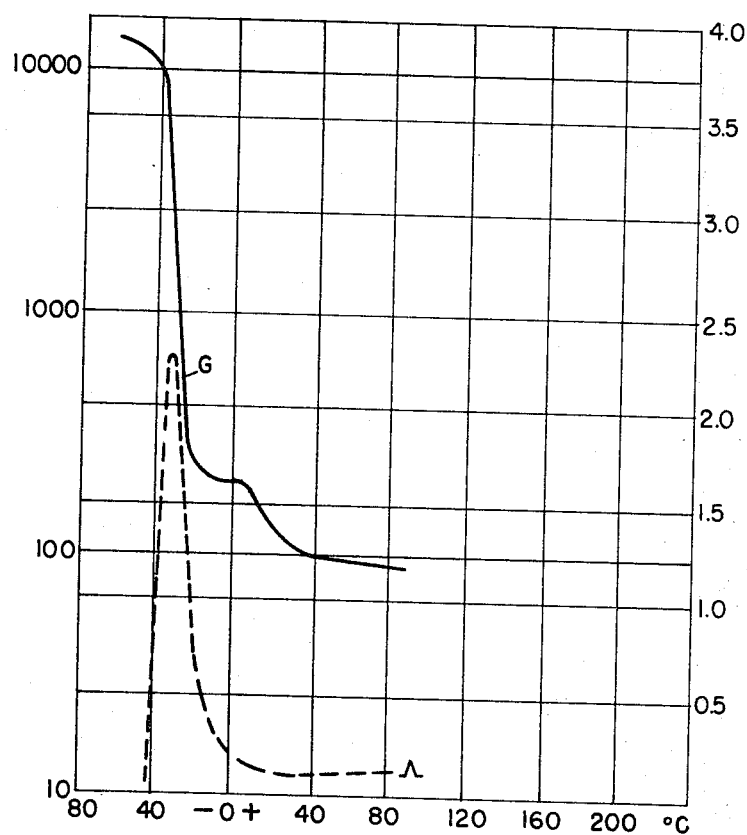
Figure 2:
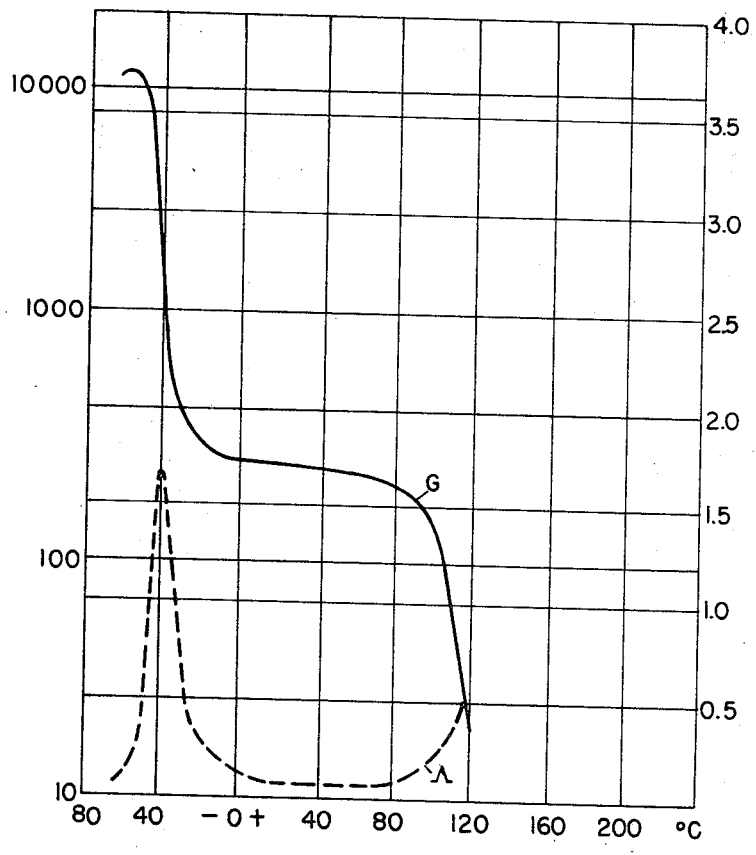
Figure 3:
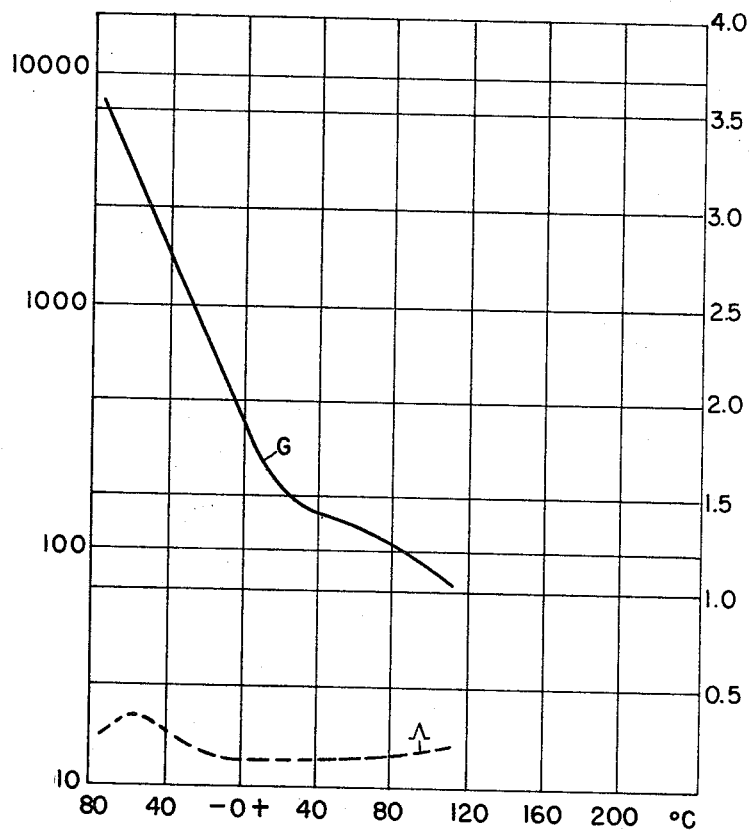
Figure 4:
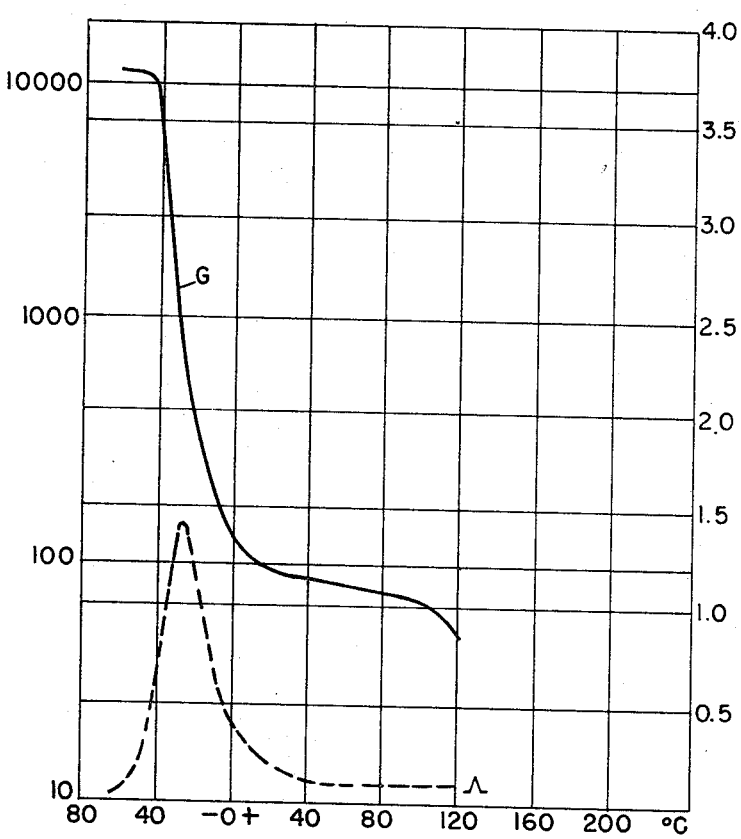

Other objects will become apparent from the following description with reference to the accompanying drawing in which FIGS. 1, 2, 3 and 4 are logarithmic curves illustrating the low temperature flexibility of the thermoplastically processed product of Examples 3, 4, 5 and 6 respectively.

The foregoing objects and others are accomplished in accordance with this invention, generally speaking, by providing a process wherein a substantially linear polyester, polyesteramide, or poly(alkylene)ether glycol, a glycol chain extender having a molecular weight of about 500 or less and an organic diisocyanate are mixed together and reacted under closely controlled conditions in critical proportions to form a thermoplastic polyurethane; the process requiring that at least one of the components used to make the mixture contain hexamethylene radicals and that the resulting polyurethane contain from about 5 percent to about 40 percent by weight hexamethylene groupings. The ratio of —NCO groups to total hydroxyls in the reaction mixture should be from about 1 to 1.3 —NCO per —OH group and preferably 1.07 —NCO per —OH.

It has been found that the quality of the thermoplastically processed polyurethane is improved considerably by including hexamethylene groups in the reaction mixture either as part of the polyester or polyether or by using hexamethylene diisocyanate or hexane diol as the chain extender and by thermoplastically processing the intermediate thermoplastic polyurethane under pressure at a temperature of about 140° C. to about 200° C.

In practicing the invention the polyester or poly (alkylene ether) glycol, organic diisocyanate and chain extender are stirred or otherwise rapidly mixed together at a temperature of from about 110° C. to about 170° C., the mixture is spread over a heated surface in a relatively thin film usually of say about ¼ inch or less and maintained within the temperature range of about 110° C. to about 170° C. until solidified at which time chemical reaction is interrupted by cooling the product below reaction temperature. The product is then comminuted into granules suitable for feeding to a thermoplastic shaping device. In order to have optimum thermoplastic properties and physical properties in the thermoplastically processed elastomer, the product at the time of thermoplastic processing should form a 10% by weight solution in dimethyl-formamide when dissolved at 50° C. having a viscosity of 10 to 30 centipoises at 20° C. If the product immediately following the cooling step produces a less viscous solution, it can be stored at room temperature until its solution has a viscosity within the required range.

The thermoplastic polyurethane can be prepared in a one-shot process by mixing all of the reactants together substantially simultaneously or by first preparing a prepolymer and then chain extending. In the one-step process the temperature of the polyester, polyesteramide or poly (alkylene ether) glycol, chain extender and dioscyanate is brought within the range of from about 110° C. to about 170° C. and stirred or otherwise intimately mixed. The substantially uniform mixture is transferred to a heated surface in the form of a thin film having a temperature about equal to that of the mixture. When the mixture solidifies, usually after about 5 to 15 minutes, the resulting solid is cooled to room temperature. It can then be granulated and if necessary stored until it forms a solution of the aforesaid viscosity. The temperature of the reaction mixture, heating surface, and other conditions are the same for the prepolymer process except in this two step reaction the polyester or poly (alkylene ether) glycol and diisocyanate are mixed together before the addition of the low molecular weight chain extender.

As pointed out hereinbefore, the product of the invention is more stable at low temperatures than polyurethanes not containing hexamethylene groupings within the prescribed range and not processed as set forth herein. The product has the added advantage of being transparent.

Any suitable polyester having a molecular weight of at least about 1000 and preferably not substantially above about 3000 can be used provided means for including the hexamethylene groups in the reaction mixture is arranged for. A molecular weight of about 2000 is preferred. The polyesters which include polyesteramides are prepared by esterification of a dicarboxylic acid and a glycol, amine or amino alcohol such as, for example, those set forth in U.S. Pat. 3,245,956 including adipic acid, succinic acid, oxalic acid, phthalic acid, 1, 4 butane diol, ethylene glycol, diethylene glycol, neopentyl glycol or the like. 1, 6-hexane diol can be used as the glycol if the polyester is to contain hexamthylene groups. The polyester can be a polyesteramide in which case the dicarboxylic acid is esterified with an amine such as, for example, ethylene diamine, butylene diamine, propylene diamine or similar aliphatic diprimary amine. Hexamethylene diamine can be used if the polyesteramide is to contribute hexamethylene groups to the polyurethane. Any suitable amino alcohol can be reacted with the dicarboxylic acid to form the polyesteramide including, for example, 1-hydroxy-2-aminoethylene or the like. Mixtures of glycol, diamine and aminoalcohol can be used. The polyester should be dehydrated and/or degassed to avoid bubbles in the polyurethane.

The hydroxyl number of the polyester preferably should be from about 28 to about 112 with about 56 being preferred. The acid number preferably should be less than 10 and usually below 2.

Any suitable poly(alkylene ether) glycol having a molecular weight of at least about 1000, preferably about 2000 and not substantially above about 3000 can be used provided the combination of reactants includes the above specified amount of hexamthylene groups. The poly (alkylene ether) glycol can be polytetramethylene ether glycol derived from tetrahydrofuran or a condensate of an alkylene oxide such as ethylene oxide, propylene oxide or the like with water or a suitable glycol initiator such as ethylene glycol, diethylene glycol, propylene glycol, butylene glycol or 1, 6-hexanediol.

Any suitable glycol having a molecular weight of less than about 500, or from about 60 to about 500 can be used as the chain extender. Preferably the chain extender is 1,4 butane diol, the diethyl ether of hydroquinone or 1,6-hexane diol, if the chain extender is to provide some of the hexamethylene groups.

Any suitable organic diisocyanate including those disclosed in U.S. 3,245,956 can be used but best results are obtained with 1,6 hexamethylene diisocyanate so it is preferred. 4,4′ diphenyl methane diisocyanate is preferred if the hexamethylene groups in the polyurethane are to be derived only from the polyester and/or chain extender. The hexamethylene groups can be present in each of the reactants.

The ratio of —NCO to hydroxyl in the chain extender preferably should be about 1.55 to 2.2 —NCO per OH group.

If hexamethylene diisocyanate is the only source of hexamethylene groups in the polyurethane the amount thereof used is preferably such that the percentage by weight of hexamethylene groups is within the range of from about 20 to about 30.

The Shore A hardness of the thermoplastically shaped product will vary from about 65 to about 95 depending upon the particular reactants and the proportions thereof.

The product of this invention having the improved low temperature flexibility is most useful for making products which may be exposed to low temperatures such as in oil seals for automobiles or for automoble shock absorbers.

The low temperature flexibility of the thermoplastically shaped product of Examples 3 through 6 is shown in the drawing, FIGS. 1 through 4, respectively.

The curve appearing at the lower part of each drawing is the damping curve or modulus obtained by twisting the product and plotting the resistance to the twisting on the temperature scale along the bottom of the drawing and the logarithm decrament along the right hand vertical margin. The low temperature flexibility value is read from the peak of the curve or is about —35° C., —40° C., —60° C. and about —28° C. for the product of Examples 3, 4, 5 and 6, respectively.

The curve appearing nearer the top of the figures of the drawing can be obtained with a Clash-Berg torsion modulus instrument. That part of the curve which is substantially vertical represents the low temperature flexibility. This curve is plotted on the temperature scale and the scale along the left hand margin.

The low temperature flexibility of the prior art polyurethanes shaped by thermoplastic processing seldom is below —20° C. Such prior art products tend to crystallize upon cooling to sub-zero temperatures and lose their elasticity.

In one embodiment of the invention, the necessary amount of polyester and/or (polyalkylene ether) glycol ester and/or polyester-amide is poured into a reaction container and melted by heating. Careful stirring of the mixture is required so that an equal distribution of heat may be achieved. At this point the temperature of the liquid material is about 50°–80° C. While thoroughly stirring the liquid, the temperature is increased so that after adding the chain extending agent, i.e. the low molecular glycol which may be at room temperature, the reaction mixture can be brought to the reaction starting temperature of from about 110° C. to 170° C. for reaction with the diisocyanate. When adding the diisocyanate, which may be in liquid or crystallized form, the temperature will initially decrease by about 20–25° C. Once the reaction begins, because of the exothermic reaction heat, the temperature increases again to the original temperature range present at the start of the reaction and at times the temperature may rise above that recorded in the beginning but should remain below 170° C. The reaction takes place within a few minutes requiring close attention to the process so as not to overlook the time at which the liquid reaction property must be poured onto the plate which is kept at about the reaction temperature. The thin layer of the material which is poured must undergo a temperature treatment until the liquid has solidified. Pouring time is determined by measuring the temperature of the reaction mixture which should not exceed about 170° C. The duration of this treatment will vary with the type of compounds used and may last from about 5 to 20 minutes. The solidified material is then cooled by means of a cooling table and, if necessary, stored at room temperature until the product as a 10% solution in dimethylformamide dissolved at 50° C. has a viscosity of 10–30 cp. (centipoise) at 20° C.

In another embodiment, the process is performed as described above, however, with the difference that the diisocyanate together with the polyester and/or poly (alkylene ether) glycol and/or polyesteramide are mixed first and the low molecular glycol or chain lengthener is added last.

In the continuous process, the polyester and/or poly (alkylene ether) glycol and/or polyesteramide is mixed with the low molecular glycol under continuous stirring and is brought to the reaction starting temperature by increasing the heat. The mixture of these compounds which is kept at a constant temperature, is then moved by means of pumps through heated pipes to a mixing head at which time the diisocyanate is added either in liquid or crystallized form. The reactants are thoroughly mixed in the mixing head and moved in liquid form onto a conveyor belt. The first part of the belt is a heating band having a heating unit; the second part of the belt is a cooling band having a cooling unit. By varying the temperature and length of the conveyor it is possible to conduct the reaction so that the product is obtained when dissolved at 50° C. in a 10% solution of dimethylformamide has a viscosity of 10–30 cps. measured at 20° C., and is suitable for further processing.

The reaction product obtained in accordance with the invention may be granulated to form particles of material having the desired size and may be stored for an unlimited period of time at storage temperatures of between −30° to +30° C. without appreciable hydrolysis.

These thermoplastic materials may then be shaped in any desired form by mechanical means such as pressure and temperature treatment as applied when using extruders, calenders, blow molders, and the like.

If the material is to be extruded it is filled into the hopper of an extruding device at room temperature. Within this device the material is kept at a temperature of about 150° to 200° C. The compression ratio of the helix of the extruder is set so that the material leaves the device under constant pressure and in a continuous strand.

If the material is to be shaped in an injection molding apparatus it is added at room temperature and heated until it has reached the plasticizing temperature of 150° C. to 190° C. In an injection molding method, the pressure is approximately 70–90 kg./cm.$^2$ and the back pressure is 12–18 kg./cm.$^2$. The molded thermoplastic products are removed from the mold after molding and are cooled at room temperature. Optimum mechanical characteristics of the finished product may be obtained by a heat treatment of 80–100° C. over a period of 24 hours, or by storing the product at room temperature for several weeks.

Of the polyurethanes provided by the invention, those made with polyesters are preferred. Best results are achieved if the polyesters used are made of adipic acid and ethylene glycol or adipic acid and both ethylene glycol and butane diol or adipic acid and both neopentyl glycol and 1,6-hexandiol and which have a hydroxyl number of approximately 56 and a molecular weight of about 2000.

These polyesters are reacted in the preferred embodiments with either 4,4′-diphenylmethandiisocyanate or 1,6-hexamethylene diisocyanate. The chain extenders are preferably 1,4-butanediol, 1,6-hexanediol or the di-(hydroxy ethyl ether) or hydroquinone, but a product having the most desirable characteristics will be achieved by using hexamethylene diisocyanate and 1,6-hexanediol.

The products having the best physical properties can be obtained by using a polyester of adipic acid/neopentyl glycol and hexanediol having a hydroxyl number of about 56 and a molecular weight of about 2000 in combination with 1,6-hexanediol and 1,6-hexamethylene diisocyanate. The product made from these components, after thermoplastic treatment, has excellent characteristics with the low temperature flexibility being from 20° C. to over 40° C. lower than that of prior art products.

The best results are obtained with poly (alkylene ether) glycols when using poly (tetramethylene ether) glycol having a hydroxyl number of 56, an acid number below 1 and a molecular weight of about 2000, 1,6-hexamethylene diisocyanate and 1,6-hexandiol as the chain extender. Such a product after thermoplastic processing will have a low temperature flexibility of 20° C. to 60° C. below that of prior art products.

In the following examples the manipulative steps are: First, the polyester or poly (alkylene ether) glycol is dehydrated or degassed under vacuum at 110° C. The low molecular glycol is added and the mixture is stirred for about 30 seconds. The starting temperature given in the examples is then reached by heating and the diisocyanate is added while stirring the mixture thoroughly. After the time period mentioned in the examples, a small amount of the liquid mixture is poured onto a plate which was pre-heated to about the same temperature as that of the reaction mixture and the mixture is held on the heated surface until it solidifies. After cooling, the solid product is stored in such a manner so that a sample of the material tested in a solution of 10% dimethylformamide at 20° C. has the required viscosity.

EXAMPLE 1

A mixture of about 1000 g. (0.5 mol) of hydroxylpolyester prepared from adipic acid and ethylene glycol having a hydroxyl number of 56, molecular weight about 2000 and acid number 1, as well as 50 g. (0.55 mol) 1,4-butanediol are simultaneously reacted with 200 g. (1.19 mol) 1,6-hexamethylene diisocyanate for 5 minutes at a temperature of about 130° C. The resulting product while still liquid is poured onto a plate of about the same temperature. After about 10 minutes the solidified material can be cooled, removed from the plate and granulated. Using thermoplastic processing equipment such as injection molding machines, extruders, blow molders and the like, the granulated material may be used for the production of the desired articles. The finished product after thermoplastic processing according to this example has the following mechanical-physical properties:

(1) Tensile strength—Ca. 250 kp./cm.$^2$
(2) Elongation at break—Ca. 700%
(3) Elasticity of compression—Ca. 55%
(4) Abrasion resistance—Ca. 30 mm.$^3$
(5) Tear propagation strength—Ca. 40 kp./cm.
(6) Shore hardness A—Ca. 70
(7) Low temperature flexibility—To −30° C.

Properties 3, 4 and 7 are particularly good and better than those of the conventional thermoplastically processed polyurethane.

EXAMPLE 2

About 1000 parts by weight (0.5 mol) of degassed and dehydrated polyester prepared from adipic acid, ethylene glycol and 1,4 butane diol hydroxyl number 56, acid number below 1, and molecular weight about 2000 are melted and heated to a temperature of about 150°. About 53 parts by weight (0.59 mol) 1,4 butane diol are added and the mixture is stirred for 30 seconds after which time the mixture is kept at a temperature of 139° C. About 200 parts by weight (1.19 mol) 1,6 hexamethylene diisocyanate are added and also stirred, whereby the temperature increases to about 152° at which level it is held for approximately 150 seconds; the mixture is then poured onto a plate which was pre-heated to the same temperature as the mixture left there until it solidifies and is then cooled. It is later granulated. The granular material may be processed thermoplastically in the same manner as that of Example 1 and will have the following mechanical-physical values:

(1) Tensile strength—About 350 kp./cm.$^2$
(2) Elongation at break—About 530%
(3) Elasticity of compression—About 45%
(4) Abrasion resistance—About 48 mm.$^3$
(5) Tear propagation strength—About 45kp./cm.
(6) Shore hardness A—About 85
(7) Low temperature flexibility—To minus 40° C.

EXAMPLE 3

A mixture of about 1000 parts by weight (0.5 mol) of hydroxyl polyester prepared by esterifying adipic acid and ethylene glycol having a hydroxyl number about 56, molecular weight of about 2000 and acid number below 1, and about 56 parts by weight (0.62 mol) 1, 4 butane diol are reacted for 5 minutes together with 200 parts by weight (1.19 mol) 1, 6 hexamethylene diisocyanate at a temperature of about 130° C. The resulting product contains 16% hexamethylene groups and is poured onto plates having been pre-heated to the same temperature. After about 10 minutes the solidfied material is cooled, removed from the plate and granulated. The granular material may be used in a thermoplastic process such as in injection molding machines, extruders, calenders and the like. The thermoplastically shaped product according to this example has the following mechanical/physical values:

(1) Tensile strength—About 250 kp./cm.$^2$
(2) Elongation at break—About 700%
(3) Elasticity of compression—About 55%
(4) Abrasion resistance—About 30 mm.$^3$
(5) Tear propagation strength—About 40 kp./cm.
(6) Shore hardness A—About 70
(7) Low temperature flexibility—To minus 35° C.

EXAMPLE 4

About 1000 parts by weight (0.5 mol) dehydrated polyester prepared from adipic acid and ethylene glycol and butane diol hydroxyl number 56, acid number below 1, molecular weight about 2000, are melted and heated to a temperature of about 150°. About 53 parts by weight (0.59 mol) 1, 4-butane diol and 20 parts bis (2, 6-diisopropyl) phenyl carbodiimide are added and stirred for 30 seconds, whereby the temperature drops to about 139° C. Then about 200 parts by weight (1.19 mol) 1, 6-hexamethylene diisocyanate are added and stirred, whereby the temperature—because of the exothermic reaction heat-increases to about 150° C. Then the reaction material is poured onto plates pre-heated to approximately the same temperature, kept at this temperature for 9 minutes, and is subsequently cooled off and granulated. After shaping by thermoplastic methods the polyurethane which contains 16% hexamethylene groups has the following mechanical/physical data:

(1) Tensile strength—Ca. 400 kp./cm.$^2$
(2) Elongation at break—Ca. 950%
(3) Elasticity of compression—Ca. 50%
(4) Abrasion resistance—Ca. 40 mm.$^3$
(5) Tear propagation strength—Ca. 55kp./cm.
(6) Shore hardness A—Ca. 84
(7) Low temperature flexibility—To minus 35° C.

EXAMPLE 5

About 1000 parts by weight (0.5 mol) degassed polytetramethyleneether glycol, hydroxyl number 56, acid number below 1, molecular weight about 2000, are melted and heated to a temperature of about 150° C. Then about 53 parts by weight (0.59 mol) 1, 4-butane diol and 20 parts of the carbodiimide used in Example 4 are stirred for 30 seconds. About 200 parts by weight (1.19 mol) 1, 6-hexamethylene diisocyanate are added and mixed, whereby the temperature—because of the exothermic reaction heat—increase to about 150° C. The material is poured onto heated plates having a temperature of about 150° C and kept at the same temperature for 15 minutes, and is granulated after it has cooled to room temperature. After thermoplastic processing, the polyurethane which contains 16% hexamethylene groups has the following mechanical/physical data:

(1) Tensile strength—About 350 kp./cm.$^2$
(2) Elongation at break—About 900%
(3) Elasticity of compression—About 63%
(4) Abrasion resistance—About 42 mm.$^3$
(5) Tear propagation strength—About 45 kp./cm.
(6) Shore hardness A—About 86
(7) Low temperature flexibility—To minus 60° C.

EXAMPLE 6

About 1000 parts by weight (0.5 mol) degassed and dehydrated polyester prepared from adipic acid, neopentyl glycol and 1, 6-hexanediol, hydroxyl number 56, acid number below 1, molecular weight about 2000, are melted and heated to a temperature of about 110° C. About 67 parts 1, 4 butane diol are stirred into the polyester. Then about 400 parts by weight (1.6 mol) 4, 4'-diphenyl-methane diisocyanate are added whereby the temperature increases to about 125° C. The material is then poured onto plates pre-heated to about the same temperature and are kept at this temperature for 10 minutes. After cooling off, the material is granulated. After shaping by thermoplastic methods, the polyurethane which has 19% hexamethylene groups has the following mechanical/physical data:

(1) Tensile strength—Ca. 250 kp./cm.$^2$
(2) Elongation at break—Ca. 600%
(3) Elasticity of compression—Ca. 35%
(4) Abrasion resistance—Ca. 50 mm.$^3$
(5) Tear propagation strength—Ca. 40 kp./cm.
(6) Shore hardness A—Ca. 82
(7) Low temperature flexibility—To minus 280 C.

EXAMPLE 7

About 1000 parts by weight (0.5 mol) degassed polyester prepared from adipic acid, ethylene glycol and 1, 4 butane diol, hydroxyl number 56, acid number below 1, molecular weight about 2000, are melted and heated to a temperature of about 110° C. Then about 79 parts by weight (0.67 mol) 1, 6-hexandiol are about 17 parts by weight of the carbodiimide of Example 4 are added and stirred for 30 seconds. Next, about 350 parts by weight (1.4 mol) 4, 4'-diphenylmethane diisocyanate are added and the liquid reaction material is poured onto a pre-heated plate of about the same temperature and kept at this temperature for 10 minutes. After cooling off, the material is granulated. After shaping by thermoplastic methods, the polyurethane which contains 5% hexamethylene groups has the following mechanical/physical data:

(1) Tensile strength—Ca. 350 kp./cm.$^2$
(2) Elongation at break—Ca. 600%
(3) Elasticity of compression—Ca. 35%
(4) Abrasion resistance—Ca. 50 mm.$^3$
(5) Tear propagation strength—Ca. 40 kp./cm.
(6) Shore hardness A—Ca. 80
(7) Low temperature flexibility—To minus 30° C.

EXAMPLE 8

About 1000 parts by weight (0.5 mol) degassed polyester prepared from adipic acid and ethylene glycol, hydroxyl number 56, acid number below 1, molecular weight about 2000, are melted and heated to a temperature of 110° C. Then, about 79 parts by weight (0.67 mol) 1, 6-hexandiol and about 17 parts by weight carbodiimide like that of Example 4 are added and stirred for 30 seconds. Next, about 350 parts by weight (1.40 mol) 4, 4'-diphenylmethane diisocyanate are mixed into the liquid reaction material which is then poured onto a pre-heated plate having about the same temperature, and is kept at this temperature for 10 minutes. After cooling, the material is granulated. After shaping by thermoplastic methods the polyurethane which contains 5% hexamethylene groups has the following mechanical/physical data:

(1) Tensile strength—Ca. 350 kp./cm.$^2$
(2) Elongation at break—Ca. 600%
(3) Elasticity of compression—Ca. 35%
(4) Abrasion resistance—Ca. 50 mm.$^3$
(5) Tear propagation strength—Ca. 40 kp./cm.
(6) Shore hardness A—Ca. 82
(7) Low temperature flexibility—To minus 25° C.

EXAMPLE 9

About 1000 parts by weight (0.5 mol) degassed polytetramethyleneether glycol, hydroxyl number 56, acid number below 1, molecular weight about 2000, are melted and heated to a temperature of 120° C. Then, about 79 parts by weight (0.67 mol) 1,6-hexanediol and 17 parts by weight carbodiimide like that of Example 4 are added and stirred for 30 seconds. Next, about 350 parts by weight (1.4 mol) 4,4'-diphenylmethane diisocyanate are added and the liquid reaction material is poured onto a preheated plate having about the same temperature, and kept at this temperature for 10 minutes. After cooling off, the material is granulated. After shaping by thermoplastic methods, the polyurethane which contains 5% hexamethylene groups has mechanical/physical data:

(1) Tensile strength—Ca. 350 kp./cm.$^2$
(2) Elongation at break—Ca. 600%
(3) Elasticity of compression—Ca. 35%
(4) Abrasion resistance—Ca. 50 mm.$^3$
(5) Tear propagation strength—Ca. 40 kp./cm.
(6) Shore hardness A—Ca. 80
(7) Low temperature flexibility—To minus 40° C.

EXAMPLE 10

About 1000 parts by weight (0.5 mol) dehydrated and degassed polyester prepared from adipic acid and ethylene glycol and 1,4 butane diol, hydroxyl number 56, acid number below 1, molecular weight about 2000, are melted and heated to a temperature of 155° C. Then about 79 parts by weight (0.67 mol) 1,6-hexanediol and about 17 parts by weight of the carbodiimide of Example 4 are added and stirred for 30 seconds. Next, about 200 weight particles (1.19 mol) 1,6-hexamethylene diisocyanate are added and the liquid reaction material is poured onto pre-heated plates having approximately the same temperature as that of the liquid and are kept at this temperature for 15 minutes. After cooling, the material is granulated. After thermoplastic shaping of the granular material, the polyurethane which contains 21% hexamethylene groups has mechanical/physical data:

(1) Tensile strength—About 250 kp./cm.$^2$
(2) Elongation at break—About 750%
(3) Elasticity of compression—About 50%
(4) Abrasion resistance—About 40 mm.$^3$
(5) Tear propagation strength—About 40 kp./cm.
(6) Shore hardness A—About 82
(7) Low temperature flexibility—Minus 40° C.

EXAMPLE 11

About 1000 parts by weight (0.5 mol) dehydrated polyester prepared from adipic acid and ethylene glycol, hydroxyl number 56, acid number below 1, molecular weight 2000 are melted and heated to a temperature of 160° C. Then about 79 parts by weight (0.67 mol) 1,6-hexandiol and about 17 parts by weight of the carbodiimide of Example 4 are added and stirred for 30 seconds. Next, about 200 parts by weight (1.19 mol) 1,6-hexamethylene diisocyanate are added and the liquid reaction material is poured onto pre-heated plates having approximately the same temperature as that of the liquid and is kept at this temperature for 15 minutes. After cooling off, the material is granulated. After thermoplastically shaping the granulated material, the resulting polyurethane containing 21% hexamethylene groups has the following mechanical/physical data:

(1) Tensile strength—About 250 kp./cm.$^2$
(2) Elongation at break—About 750%
(3) Elasticity at compression—About 50%
(4) Abrasion resistance—About 40 mm.$^3$
(5) Tear propagation strength—About 40 kp./cm.
(6) Shore hardness A—About 84
(7) Low temperature flexibility—To −30° C.

EXAMPLE 12

About 1000 parts by weight (0.5 mol) dehydrated polytetramethylenether glycol, hydroxyl number 56, acid number below 1, molecular weight about 2000, are melted and heated to a temperature of 150° C. Then, about 79 parts by weight (0.67 mol) 1,6-hexanediol and about 17 parts by weight carbodiimide of Example 4 and stirred for 30 seconds. Next, about 200 parts by weight (1.19 mol) 1,6-hexamethylene diisocyanate are added and mixed and the liquid reaction material is poured onto pre-heated plates having approximately the same temperature as that of the liquid and is kept at this temperature for 15 minutes. After cooling off, the material is granulated. After shaping by thermoplastic methods, the polyurethane which contains 21% hexamethylene groups has the following mechanical/physical data:

(1) Tensile strength—About 250 kp./cm.$^2$
(2) Elongation at break—About 750%
(3) Elasticity at compression—About 60%
(4) Abrasion resistance—About 40 mm.$^3$
(5) Tear propagation strength—About 40 kp./cm.
(6) Shore hardness A—About 82
(7) Low temperature flexibility—To −60° C.

EXAMPLE 13

About 1000 parts by weight (0.5 mol) polyester prepared from adipic acid and neopentyl glycol and hexanediol, hydroxyl number 56, acid number below 1, molecular weight about 2000, are melted and heated to a temperature of 150° C. Then about 53 parts by weight (0.59 mol) 1,4-butane diol and 20 parts by weight of the carbodiimide of Example 4 are added and stirred for 30 seconds, whereby the temperature decreases to 139° C. Next, about 200 parts by weight (1.19 mol) 1,6-hexamethylene diisocyanate are added and mixed, whereby the temperature because of the exothermic reaction increases to 150° C. The reaction material is poured onto preheated plates having approximately the same temperature as the reaction mixture and is kept at this temperature for 12 minutes. After cooling off, the material is granulated. After shaping by thermoplastic methods the polyurethane which contains 35% hexamethylene groups has the following mechanical/physical data:

(1) Tensile strength—About 250 kp./cm.$^2$
(2) Elongation at break—About 750%
(3) Elasticity at compression—About 50%
(4) Abrasion resistance—About 40 mm.$^3$
(5) Tear propagation strength—About 40 kp./cm.
(6) Shore hardness A—About 82
(7) Low temperature flexibility—To −40° C.

EXAMPLE 14

About 1000 parts by weight (0.5 mol) of hydroxyl polyester prepared from adipic acid and neopentyl glycol and 1,6-hexanediol, hydroxyl number 56, acid number below 1, molecular weight about 2000, are melted and heated to a temperature of 170° C. Then about 79 parts by weight (0.67 mol) 1,6-hexanediol and about 20 parts by weight of the carbodiimide of Example 4 are added and stirred for 30 seconds, whereby the temperature decreases to 160° C. Next, about 200 parts by weight (1.19 mol) 1,6-hexamethylene diisocyanate are added and stirred and the liquid reaction material is poured onto pre-heated plates having approximately the same temperature, and is kept at this temperature for 20 minutes. After cooling off, the material is granulated. After processing by thermoplastic methods, the polyurethane which contains 40% hexamethylene groups has the following mechanical/ physical data:

(1) Tensile strength—About 250 kp./cm.$^2$
(2) Elongation at break—About 750%.
(3) Elasticity at compression—About 50%.
(4) Abrasion resistance—About 40 mm.$^3$
(5) Tear propagation strength—About 40 kp./cm.
(6) Shore hardness A—About 82
(7) Low temperature flexibility—To −45° C.

It is to be understood that any of the reactants indicated as suitable herein can be substituted for those in the foregoing examples provided the molar ratio and the percentage hexamethylene groups is not materially changed.

I claim:
1. A storage-stable polyurethane thermoplastically processable to make an elastomeric product having im- proved low-temperature flexibility comprising the reaction product of
(1) a polyester, poly(alkylene ether) glycol or polyesteramide having a molecular weight of at least about 1000,
(2) a glycol having a molecular weight of about 500 or less, and
(3) hexamethylene diisocyanate, with the proviso that the polyurethane contains hexamethylene moieties in such proportion that from about 5 to about 40 percent by weight of the polyurethane consists of hexamethylene moieties.

2. The product prepared by thermoplastically processing the product of claim 1.

3. The product of claim 1 wherein (1) is a polyester prepared from a dicarboxylic acid and a glycol and has a molecular weight of from about 1000 to about 3000.

4. The product of claim 1 wherein (1) is a poly(tetramethylene) ether glycol.

5. The product of claim 1 wherein (1), (2) and (3) each contain hexamethylene groups.

References Cited

UNITED STATES PATENTS

| 2,729,618 | 1/1956 | Mueller et al. | 260—75 |
| 2,871,218 | 1/1959 | Schollenberger | 260—45.4 |
| 2,953,539 | 9/1960 | Keplinger et al. | 260—31.6 |
| 3,211,701 | 10/1965 | Mueller et al. | 260—75 |
| 3,214,411 | 10/1965 | Saunders et al. | 260—75 |
| 3,248,370 | 4/1966 | Reischl et al. | 260—75 |

FOREIGN PATENTS

| 919,406 | 2/1963 | Great Britain. |
| 1,002,520 | 8/1965 | Great Britain. |
| 1,075,274 | 7/1967 | Great Britain. |
| 6,404,808 | 12/1964 | Netherlands. |

DONALD E. CZAJA, Primary Examiner

H. S. COCKERAM, Assistant Examiner

U.S. Cl. X.R.

260—77.5